United States Patent [19]

Agustin et al.

[11] Patent Number: 5,758,491
[45] Date of Patent: Jun. 2, 1998

[54] DIAGNOSING SYSTEM AND METHOD OF CATALYTIC CONVERTER FOR CONTROLLING EXHAUST GAS OF INTERNAL COMBUSTION ENGINE

[75] Inventors: Rogelio B. Agustin, Farmington Hills, Mich.; Akihito Numata, Ibaraki-ken, Japan; Kazuya Kawano, Hitachinaka, Japan; Yutaka Takaku; Toshio Ishii, both of Mito, Japan

[73] Assignees: Hitachi, Ltd.; Hitachi Car Engineering Co., Ltd., both of Japan

[21] Appl. No.: 651,558

[22] Filed: May 22, 1996

[30] Foreign Application Priority Data

May 22, 1995 [JP] Japan ................. 7-122171

[51] Int. Cl.$^6$ .......................... F01N 3/18; F01N 3/20
[52] U.S. Cl. ........................ 60/274; 60/276; 60/277
[58] Field of Search ..................... 123/274, 276, 123/277

[56] References Cited

U.S. PATENT DOCUMENTS

| | | | |
|---|---|---|---|
| 5,233,829 | 8/1993 | Komatsu | 60/276 |
| 5,341,642 | 8/1994 | Kurihara et al. | 60/276 |
| 5,355,672 | 10/1994 | Adamczyk, Jr. et al. | 60/274 |
| 5,377,484 | 1/1995 | Shimizu | 60/276 |
| 5,394,691 | 3/1995 | Seki | 60/277 |
| 5,414,994 | 5/1995 | Cullen et al. | 60/277 |
| 5,417,058 | 5/1995 | Shimizu | 60/277 |
| 5,485,382 | 1/1996 | Seki et al. | 60/277 |

FOREIGN PATENT DOCUMENTS

| | | |
|---|---|---|
| 40 24 210 A1 | 2/1992 | Germany . |
| 63-97852 | 4/1988 | Japan . |

*Primary Examiner*—Willis R. Wolfe
*Attorney, Agent, or Firm*—Evenson, McKeown, Edwards & Lenahan, P.L.L.C.

[57] ABSTRACT

A diagnosing system of a catalytic converter in an internal combustion engine has a detecting unit to detect an operating state of the engine and an air/fuel ratio control unit to adjust a fuel injection amount so as to keep an air/fuel ratio of a mixture that is inhaled into the engine to a target value. The operating state of the engine is detected, whereby it is confirmed that the engine lies in a predetermined operating region to execute a catalyst diagnosis on the basis of the detected operating state. In each of a plurality of different catalyst diagnosis regions, the performance of the catalytic converter or the performance of the catalytic converter array is diagnosed on the basis of the output signal of the first exhaust gas component sensor arranged on the upstream side of the catalytic converter array and the output signal of the second exhaust gas component sensor arranged on the downstream side.

39 Claims, 7 Drawing Sheets

DIAGNOSING SYSTEM AND METHOD OF CATALYTIC CONVERTER FOR CONTROLLING EXHAUST GAS OF INTERNAL COMBUSTION ENGINE

BACKGROUND OF THE INVENTION

The invention relates to system and method for diagnosing a performance of a catalytic converter which is arranged in an exhaust passage in order to convert harmful components in an exhaust gas of an internal combustion engine into harmless components. More particularly, the invention relates to novel diagnosing system and method of a catalytic converter in an internal combustion engine in which a plurality of catalytic converters are serially arranged in an exhaust passage.

An exhaust gas control system of an internal combustion engine (hereinafter, simply referred to as an engine) mainly has a catalytic converter and an air/fuel (A/F) ratio feedback control apparatus. The catalytic converter which is arranged in an exhaust pipe of the engine chemically changes hydro carbon (HC), nitrogen oxide (NOx), and carbon monoxide (CO) as harmful components in the exhaust gas by a catalytic function, thereby converting into harmless components. The A/F feedback control apparatus controls a fuel injection amount so that an intake mixture is maintained to a target A/F ratio at which the most efficient converting performance of the catalytic converter is made. In the A/F ratio feedback control apparatus, on the basis of a signal from an A/F ratio sensor or an oxygen sensor arranged on the upstream side of the catalytic converter, an error from the target A/F ratio is detected and the fuel injection amount is controlled so as to eliminate the error.

As one of the kinds of catalysts which are used for the catalytic converter, there is a 3-way catalyst. According to the 3-way catalyst, since a lead component or other impurities contained in a gasoline fuel are adhered and deposited to a catalytic material during a use period of time of the engine, so that a performance for converting the exhaust gas components deteriorates.

When the catalytic function deteriorates due to an aging change and an oxygen occlusion performance deteriorates, there is hardly a difference between oxygen concentrations in exhaust gases on the upstream side (entrance side) and the downstream side (exit side) of the catalytic converter. Therefore, by detecting concentrations of the exhaust gas components on the upstream and downstream sides of the catalytic converter and by comparing them, a deterioration in catalyst can be indirectly judged.

JP-A-63-97852 discloses a single catalytic converter provided in an exhaust system of an internal combustion engine and an air/fuel ratio control apparatus in which A/F ratio sensors are respectively arranged on the upstream side and downstream side of the catalytic converter. An A/F ratio feedback control is executed by using an output signal of the A/F ratio sensor on the upstream side. The number of times of the inversion of an output signal of the A/F ratio sensor on the downstream side is counted. On the basis of the number of times of the output inversion, a deterioration of the catalytic converter is diagnosed.

In order to convert a large quantity of exhaust gas components which are generated in case of driving the engine for a cold period of time to harmless components as quickly as possible, in addition to a main catalytic converter, there is a case where a pre catalytic converter having a relatively small capacity is arranged in an exhaust pipe just after an exhaust manifold. The pre catalytic converter of a small capacity arranged on the upstream side of the exhaust passage activates earlier than the main catalytic converter of a large capacity which is arranged in the downstream.

An example of an exhaust control system having a plurality of catalytic converters has been disclosed in U.S. Pat. No. 5,233,829, issued on Aug. 10, 1993. According to such a U.S. Patent, a secondary catalytic converter of a small capacity is arranged for an exhaust manifold of each bank of a V-type engine and a primary catalytic converter of a large capacity is arranged on the further downstream side of the location where exhaust pipes from both banks are collected. First and second exhaust sensors are arranged before and after the secondary catalytic converter of each bank and a third exhaust sensor is arranged on the downstream of the primary catalytic converter. The A/F ratio feedback control is executed by using an output signal of the first exhaust sensor. During the A/F ratio feedback control, by comparing output signals of the first and second exhaust sensors, a deterioration of the secondary catalytic converter is diagnosed. When the deterioration of the primary catalytic converter is diagnosed, the A/F ratio feedback control is executed by the output signal of the second exhaust gas sensor. By comparing the output signals of the second and third exhaust sensors at that time, the deterioration of the primary catalytic converter is diagnosed.

In U.S. Pat. No. 5,377,484 as well, there is disclosed an exhaust system such that a start catalytic converter of a small capacity is arranged in an exhaust manifold of each bank of a V-type engine and a main catalytic converter of a large capacity is arranged on the further downstream side of the location where the exhaust pipes from both banks are collected. A first $O_2$ (oxygen) sensor is arranged in the upstream side of the start catalytic converter of each bank. A second $O_2$ sensor is arranged in the downstream of the main catalytic converter. The A/F ratio feedback control is executed by using an output signal of a first exhaust sensor. In the invention of this U.S. Patent, an oxygen concentration change in the portion where both banks are collected, namely, at the entrance of the main catalytic converter is presumed from an output of the first $O_2$ sensor. The presence or absence of the deterioration of the main catalytic converter is judged on the basis of an presumption signal and an output of the second $O_2$ sensor.

In the exhaust system having a plurality of catalytic converters arranged serially, since exhaust gas atmospheres which act on the upper catalytic converter and the lower catalytic converter differ, degrees of aging deterioration of the upper and lower catalytic converters also differ. It is desirable that the deterioration of the upper catalytic converter and the deterioration of the lower catalytic converter can be independently accurately detected.

In the exhaust system having a plurality of catalytic converters arranged serially, as compared with an exhaust system having a single catalytic converter, a larger quantity of oxygen in the exhaust gas is absorbed by the upper and lower catalytic converters. Therefore, when the A/F ratio feedback control is executed by the exhaust gas sensor in the upstream of the upper catalytic converter, a fluctuation of an oxygen partial pressure in the exhaust gas in the downstream (exit) of the lower catalytic converter is extremely small.

As disclosed in U.S. Pat. No. 5,233,829, in case of detecting the deterioration of the upper and lower catalytic converters by the first, second, and third exhaust gas sensors, unless the catalytic performance remarkably deteriorates, an enough large change doesn't appear in the output of the third exhaust gas sensor, so that it is difficult to accurately judge the deterioration of the lower catalytic converter. Further, according to the invention of this U.S. Patent, in order to diagnose the catalyst on the downstream side, a control mode is changed so as to purposely perform the A/F ratio feedback on the basis of the output of the second exhaust gas sensor. A change in A/F ratio control parameter for the purpose of the diagnosis of the deterioration of the catalyst is unpreferable because an adverse influence is exerted on an exhaust emission. Further, according to the above U.S. Patent, the number of exhaust gas sensors increases.

According to the diagnosing method disclosed in U.S. Pat. No. 5,377,484, a complicated processing step for an arithmetic operation to presume the change in concentration of oxygen in the exhaust gas in the intermediate portion of the upper and lower catalytic converters is needed.

SUMMARY OF THE INVENTION

It is an object of the invention to provide catalyst diagnosing system and method in a plurality of catalytic converters arranged serially, wherein a deterioration of each catalytic converter and a whole deterioration of a plurality of catalytic converters can be easily accurately judged.

A diagnosing system of a catalytic converter according to one aspect of the invention is applied to an internal combustion engine having: a detecting unit for detecting an operating state of the engine; and an A/F ratio control unit for adjusting a fuel injection amount so as to keep an air/fuel ratio of a mixture that is inhaled into the engine to a target value. Further, the diagnosing system has: a catalytic converter array including a plurality of catalytic converters arranged serially in an exhaust gas passage of the engine; a first exhaust gas component sensor arranged on the upstream side of the catalytic converter array; a second exhaust gas component sensor arranged on the downstream side of the catalytic converter array; and a diagnosing unit for diagnosing a performance of a part of the plurality of catalytic converters or the whole catalytic converter array on the basis of output signals of the first and second exhaust gas component sensors in accordance with the operating state detected.

A diagnosing system of a catalytic converter according to another aspect of the invention is applied to an internal combustion engine having: a detecting unit for detecting an operating state of the engine; and an A/F ratio control unit for adjusting a fuel injection amount so as to keep an air/fuel ratio of a mixture that is inhaled into the engine to a target value. Further, the diagnosing system has: a catalytic converter array including a upper catalytic converter arranged on the upstream side of an exhaust gas passage of the engine and a lower (main) catalytic converter arranged on the downstream side; a first exhaust gas component sensor arranged on the upstream side of the catalytic converter array; a second exhaust gas component sensor arranged on the downstream side of the catalytic converter array; a bypass passage for bypassing the lower catalytic converter; a valve device for controlling in a manner such that an exhaust gas which passed through the upper catalytic converter is allowed to pass through either one of the lower catalytic converter and the bypass passage by a switching signal; and a diagnosing unit for diagnosing performances of the upper catalytic converter and main catalytic converter or a performance of the catalytic converter array on the basis of output signals of the first and second exhaust gas component sensors.

According to a diagnosing method of a catalytic converter according to one aspect of the invention, an operating state of an internal combustion engine is detected, a fact that the engine is in a predetermined operating region for executing a catalyst diagnosis is confirmed on the basis of the detected operating state, and in each of a plurality of different catalyst diagnosis regions, a performance of the catalytic converter or catalytic converter array is diagnosed on the basis of an output signal of a first exhaust gas component sensor arranged on the upstream side of the catalytic converter array and an output signal of a second exhaust gas component sensor arranged on the downstream side.

A diagnosing method of a catalytic converter according to further another aspect of the invention has the steps of: allowing an exhaust gas which passed through a upper catalytic converter to pass through a lower catalytic converter; allowing the exhaust gas which passed through the upper catalytic converter to be bypassed the lower catalytic converter; and in each of the above steps, diagnosing performances of the upper catalytic converter and lower catalytic converter or a performance of a catalytic converter array on the basis of output signals of first and second exhaust gas component sensors.

The above and other objects and features of the present invention will become apparent from the following detailed description and the appended claims with reference to the accompanying drawings.

DESCRIPTION OF THE PREFERRED EMBODIMENTS

A catalytic converter diagnosing system of an embodiment of the invention will now be described hereinbelow with reference to the drawings.

Figure 1:
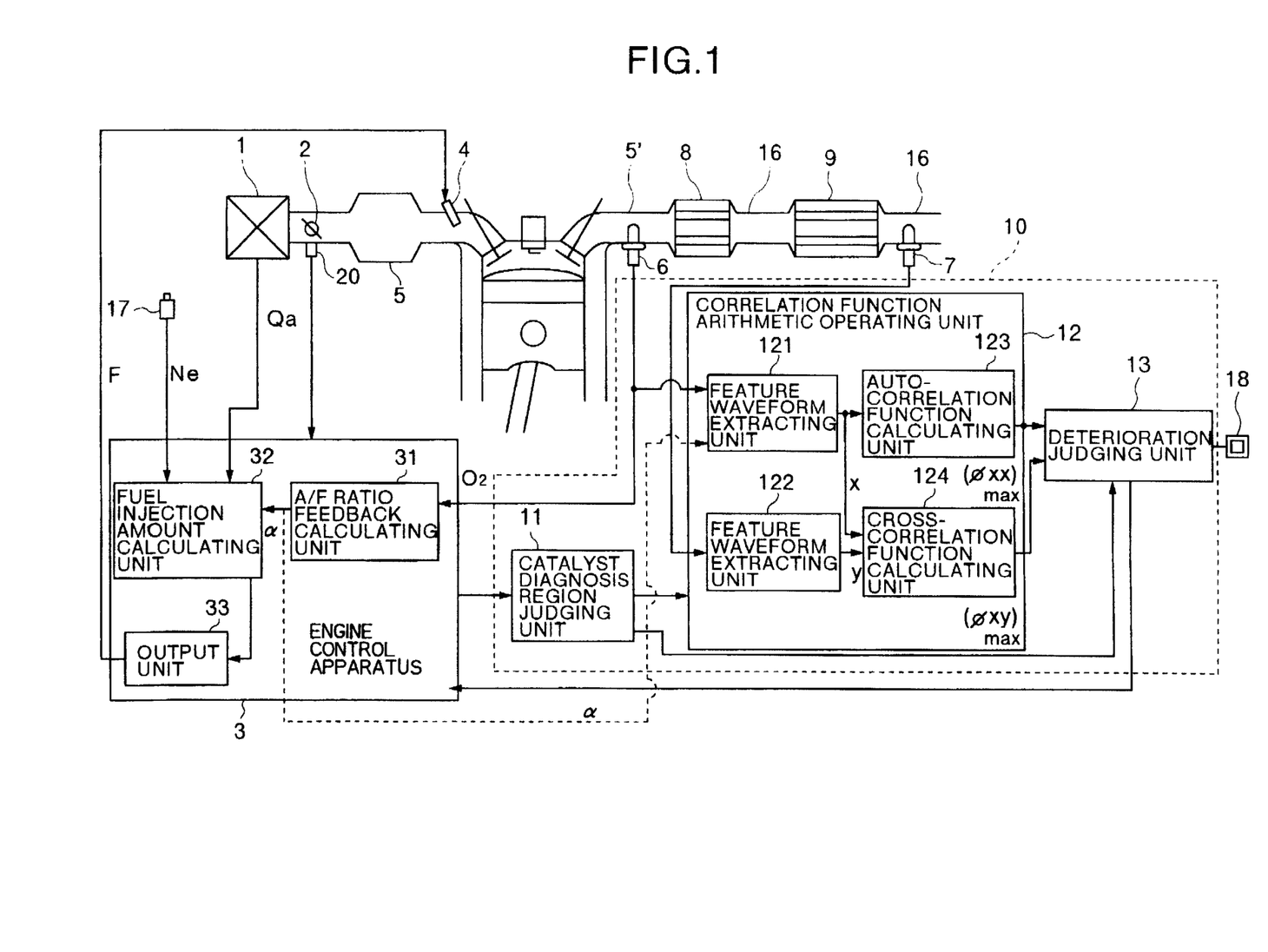
FIG. 1 is a block diagram of a diagnosing system of a catalytic converter in an exhaust gas control system according to an embodiment of the invention.

FIG. 1 is a fundamental constructional diagram of a diagnosing system of an exhaust emission control system of an internal combustion engine of the invention.

In the system of the embodiment, a flow rate Qa of an intake air which passed through an air cleaner (not shown) and a throttle valve 2 is measured by an air flow sensor 1. A throttle angle is detected by a throttle sensor 20. A control apparatus 3 of the engine calculates a proper fuel injection amount on the basis of the measured value Qa of the air flow sensor 1 and outputs of a rotation sensor 17 and an $O_2$ sensor 6 or the like. A fuel is injected by an injector 4 by using a calculation result F.

The control apparatus 3 is constructed by including a fuel injection amount calculating unit 32; an output unit 33; and an air/fuel ratio feedback calculating unit 31. The fuel injection amount calculating unit 32 obtains a fundamental injection amount Fo in accordance with the following equation (1) on the basis of a load of the engine, for example, the intake air flow rate Qa and a detection value of a rotational speed Ne from the rotation sensor 17.

$$Fo = koQa/Ne \quad (1)$$

Fo: fundamental injection amount
Qa: intake air flow rate
Ne: rotational speed
ko: constant On the other hand, the A/F ratio feedback calculating unit 31 samples the output of the A/F ratio sensor 6 provided in the upstream of a catalytic converter 8 as a predetermined timing, thereby generating a correction signal a in accordance with the detection value. The fuel injection amount calculating unit 31 obtains the injection amount F by the following equation (2) in consideration of the correction signal α to the fundamental injection amount Fo. The injection amount F is changed to a voltage duty signal by the output unit 33 and is applied to the fuel injection valve 4.

$$F = koQa/Ne(1+\alpha) \quad (2)$$

F: injection amount
Fo: fundamental injection amount
Qa: intake air flow rate
Ne: rotational speed
α: correction signal By such a feedback control, an air/fuel ratio of the mixture gas is perturbating at a stoichiometric value.

Therefore, the output of the $O_2$ sensor 6 also similarly changes in correspondence to a perturbation of the A/F ratio.

The mixture of the intake air and the fuel passes through the intake manifold 5 and is injected into a combustion chamber of the engine. After completion of steps of the compression, combustion, and expansion in a cylinder, the exhaust gas is exhausted to an exhaust manifold 5'. To know an oxygen concentration in the exhaust gas, the first A/F ratio sensor 6 is attached in the exhaust manifold 5' or an exhaust pipe 16 just after the exhaust manifold. On the basis of the signal of the first A/F ratio sensor 6, a correction (α) of the fuel injection amount is executed so that the A/F ratio of the mixture gas approaches a target value. In the system, the start catalytic converter 8 and a main catalytic converter 9 arranged serially are provided as exhaust emission control systems. A capacity of the start catalytic converter 8 is smaller than that of the main catalytic converter 9. Further, a second A/F ratio sensor 7 is attached to the downstream of the main catalytic converter 9. In the embodiment, the oxygen sensor is used as an A/F ratio sensor.

Assuming that an oxygen concentration value in the exhaust gas corresponding to a stoichiometric air/fuel ratio value is set to a center value, the oxygen sensor generates a binary signal according to a case where the oxygen concentration is larger than such a center value (lean mixture) and a case where it is smaller than the center value (rich mixture). In the invention, it is also possible to use an A/F ratio sensor which can generate a signal as a signal of a continuous change in accordance with a change in value of the oxygen concentration in the exhaust gas corresponding to a change in A/F ratio in addition to the oxygen sensor. Further, sensors for detecting an exhaust gas component such as HC, CO, NOx, or the like other than oxygen.

The control apparatus 3 is realized by a microcomputer. A CPU of the microcomputer receives signals from various external sensors in accordance with various control programs including the A/F ratio feedback control stored in a memory device, executes the program, and outputs control signals to the other external apparatuses. Since the microcomputer is a computer having a general structure, the CPU and memory device are not shown in the diagram.

Each portion of a catalyst diagnosing unit 10 of the system of the embodiment will be described hereinbelow.

A signal indicating the operating state of the engine is inputted to a catalyst diagnosis region judging unit 11 through the control apparatus 3. The diagnosis region judging unit 11 judges whether the operating state lies in a region suitable for a diagnosis of an individual catalyst or a diagnosis of whole catalysts or not.

In the embodiment, a correlation method of obtaining a correlation relation between output signals of the A/F ratio sensors 6 and 7 before and after the catalyst is used as a catalyst diagnosing system. If the upper catalytic converter 8 or lower catalytic converter 9 doesn't deteriorate, a change in sensor output (corresponding to a fluctuation of the A/F ratio) decreases in the downstream of the catalytic converter due to the oxidizing/reducing operation of the catalytic converter. Therefore, a fluctuation of the output signal of the A/F ratio sensor 7 on the downstream side also decreases. When the catalytic converters 8 and 9 deteriorate, on the other hand, the fluctuation of the output of the A/F ratio sensor 7 in the downstream approaches the fluctuation of the output of the sensor 6 in the upstream. A deterioration of the catalyst is diagnosed by paying attention to a similarity of the fluctuations of the A/F ratios before and after the catalytic converters as mentioned above. As a value indicative of the similarity of the A/F ratios before and after the catalytic converters 8 and 9, a cross-correlation function of the output signals of the A/F ratio sensors 6 and 7 before and after the catalyst is obtained. A similarity of changes of the oxygen concentrations in the exhaust gas (corresponding to the fluctuation of the A/F ratio) before and after the catalytic converters 8 and 9 is examined. Namely, when the similarity of the output signals of the A/F ratio sensors 6 and 7 before and after the catalytic converters 8 and 9 is high, the correlation function shows a large value. When the similarity is low, the correlation function shows a small value.

When the correlation function is large, the deterioration of the catalytic converter is large. When the correlation function is small, the deterioration is small.

A value other than the cross-correlation function can be used as a value indicative of a deterioration degree so long as it is a value showing the similarity of the fluctuations of the A/F ratios before and after the catalytic converters 8 and 9.

The following methods can be proposed as a method of judging the similarity of the outputs of the A/F ratio sensors before and after the catalytic converters other than the correlation function.

(1) The numbers of times of the output polarity inversion in a predetermined time of the oxygen sensor before and after (entrance and exit) of the catalytic converter are compared.

(2) A phase difference between the output signals of the oxygen sensor before and after the catalytic converter is detected.

(3) A frequency ratio between the output signals of the oxygen sensor before and after the catalytic converter is detected.

(4) An amplitude ratio between the output signals of the oxygen sensor before and after the catalytic converter is detected.

(5) An output difference between the output signals of the A/F ratio sensor before and after the catalytic converter is detected. In this case, the A/F ratio sensor generates a continuous signal corresponding to the value of the A/F ratio.

(6) Component transformation efficiencies of the output signals of the exhaust component sensors before and after the catalytic converter are detected. The exhaust component sensor in this case is not limited to the $O_2$ sensor but any one of the sensors for detecting HC, CO, and NOx can be used.

(7) Integration values of the output signals of the exhaust component sensor before and after the catalytic converter are detected.

(8) Exhaust temperatures before and after the catalytic converter are compared.

A correlation function value of the output signals of the first and second A/F ratio sensors 6 and 7 is calculated by a correlation function arithmetic operating unit 12. A deterioration judging unit 13 performs a deterioration diagnosis of the upper and lower catalytic converters 8 and 9 or a deterioration diagnosis of the whole catalysts of the catalytic converters 8 and 9 on the basis of the correlation function value.

When it is judged that the operating state of the engine has entered a catalyst diagnosis region, the arithmetic operation of each of the correlation functions is executed. Conditions for diagnosing include at least conditions such as rotational speed of the engine, load, intake air amount, cooling water temperature, A/F ratio feedback condition, catalyst temperature, and the like. The catalyst temperature can be directly measured by using a temperature sensor or the like or can be also presumed on the basis of the operating state of the engine.

The operation of the correlation function arithmetic operating unit 12 is as follows. First, the components which are not directly concerned with the deterioration of the catalytic converters 8 and 9, namely, the component which will be able to become causes of an error when executing the arithmetic operations using the correlation function are eliminated from the outputs of the $O_2$ sensors 6 and 7 by feature waveform extracting units 121 and 122. As feature waveform extracting units 121 and 122, it is proper to use differentiation filters, high pass filters, or band pass filters. Hereinafter, the signal which is caused by the $O_2$ sensor 6 is shown by reference character "x" and the signal which is caused by the $O_2$ sensor 7 is shown by reference character "y".

An auto-correlation function $\phi xx$ of the output signal x of the $O_2$ sensor 6 is calculated by an auto-correlation function calculating unit 123 in accordance with the following equation (3). A cross-correlation function $\phi xy$ between the output signal x of the $O_2$ sensor 6 and the output signal y of the $O_2$ sensor 7 is calculated by a cross-correlation function calculating unit 124 in accordance with the following equation (4).

$$\phi xx(\tau) = \int x(t)x(t-\tau)dt \qquad (3)$$

$$\phi xy(\tau) = \int x(t)y(t-\tau)dt \qquad (4)$$

t: time
$\tau$: phase

Further, the phase $\tau$ is changed in an integration interval (0~T) of the correlation function, thereby obtaining the maximum value ($\phi xy$)max of $\phi xy$ and the maximum value ($\phi xx$)max of $\phi xx$. By using those values, the deterioration of the catalytic converters 8 and 9 is judged.

The deterioration judgments of the catalytic converters 8 and 9 are executed by the catalytic converter deterioration judging unit 13. The catalytic converter deterioration judging unit 13 calculates a successive deterioration index $\phi 1$ in accordance with the following equation (5). By comparing the index $\phi 1$ with a predetermined reference value, the deterioration of the catalytic converters is judged.

$$\phi 1 = (\phi xy)max/((\phi xx)max \qquad (5)$$

Namely, when the catalyst deteriorates, a similarity of the A/F ratio perturbations before and after the catalytic converters increases, so that the successive deterioration index $\phi 1$ enlarges (approaches 1).

The correlation function arithmetic operating unit 12 and deterioration judging unit 13 are mainly constructed by a single chip microcomputer having therein an A/D converter and a high pass filter. The high pass filter corresponds to the feature waveform extracting units 121 and 122.

The arithmetic operating unit 12 may be also made by utilizing the circuit structures disclosed in U.S. Pat. No. 5,341,642 issued on Aug. 30, 1994.

Although not shown in FIG. 1, a sampling circuit of the output signals of the A/F ratio sensors 6 and 7 is also provided for the correlation function arithmetic operating unit 12.

Each of the calculated correlation function values is inputted to the deterioration judging unit 13 and is compared with a predetermined deterioration judging level of each catalyst. When it exceeds the deterioration judging level, it is judged that the catalyst deteriorated. The operating state upon diagnosis is inputted to the deterioration judging unit 13 through the diagnosis region judging unit 11 and a correction of the judgment result due to the operating state is also executed. Further, the result of the judgment is stored into a memory (not shown). When it is judged that the catalytic converter deteriorated, for example, by lighting on a display lamp 18, a failure of the catalytic converters is informed to the driver.

One of the features of the diagnosing system in the embodiment is that the arithmetic operations of the correlation functions for judgment of the deterioration of the upper and lower catalytic converters in the upstream and downstream of the exhaust pipe are individually executed in a plurality of different operating regions. The reasons and the diagnosis region will now be described with reference to FIGS. 2 and 3.

Figure 2:
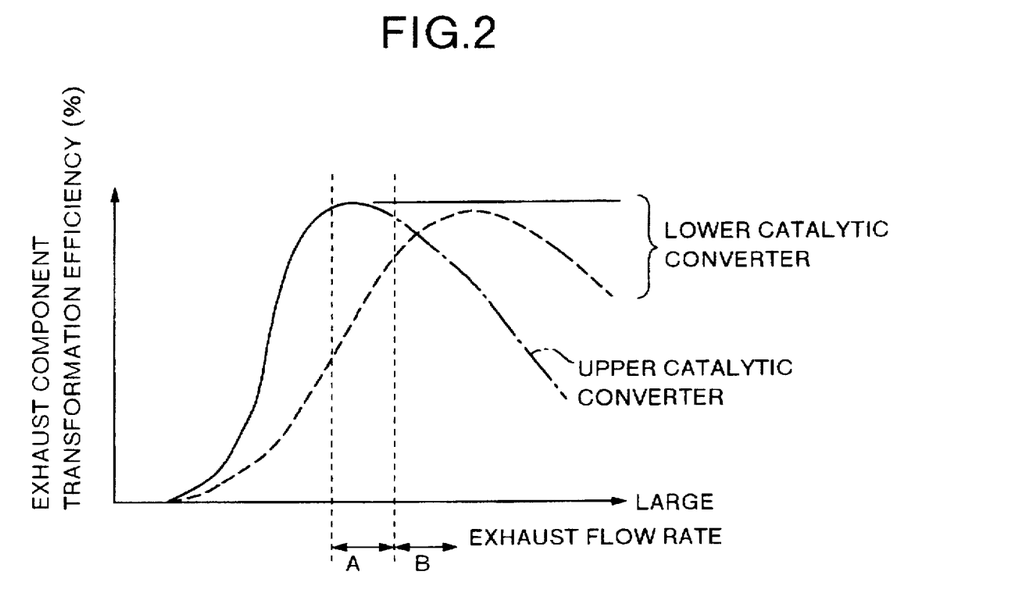
FIG. 2 is a characteristic diagram of an exhaust component transformation efficiency for an exhaust flow rate of a catalytic converter.
Figure 3:
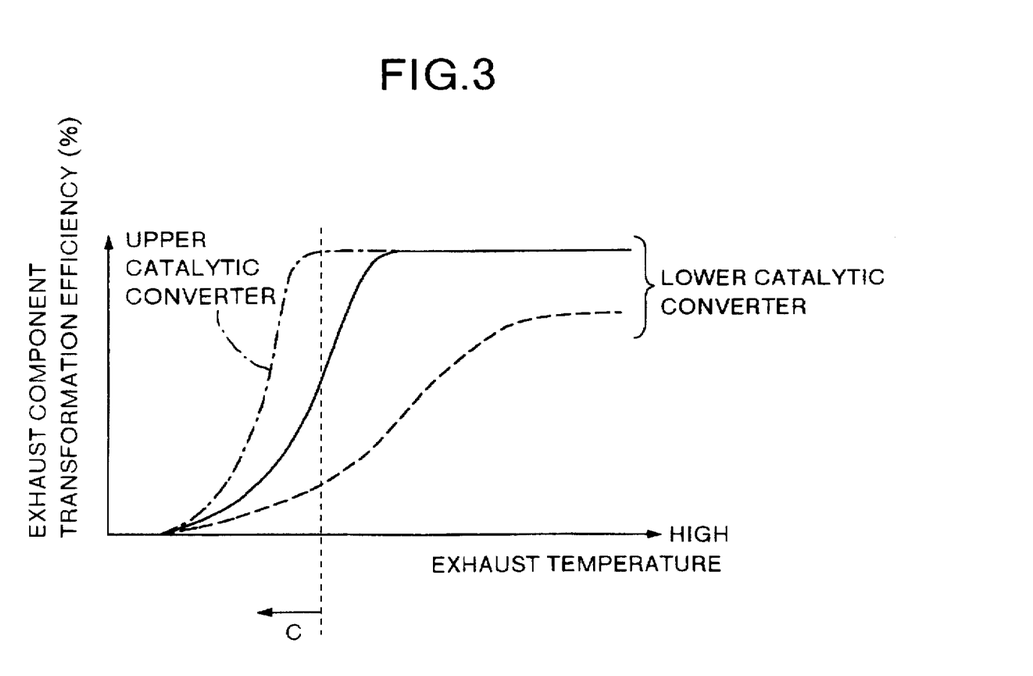
FIG. 3 is a characteristic diagram of an exhaust component transformation efficiency for an exhaust temperature of a catalytic converter.

FIGS. 2 and 3 show exhaust component transformation efficiencies of the catalysts for the exhaust gas flow rate and exhaust gas temperature state. Generally, in many cases, as a upper catalytic converter 8 on the upstream side of the exhaust pipe, a converter of a capacity (volume) smaller than that of the lower catalytic converter 9 on the downstream side of the exhaust pipe is used in order to promote the activation of the catalyst. Therefore, as for FIGS. 2 and 3, explanation will be made with respect to a system in which the upper catalytic converter 8 has a capacity (volume) smaller than that of the lower catalytic converter 9 as a prerequisite.

In FIG. 2, an axis of abscissa denotes an exhaust flow rate per unit time and an axis of ordinate indicates an exhaust component transformation efficiency. In FIG. 3, an axis of abscissa denotes an exhaust temperature and an axis of ordinate indicates an exhaust component transformation efficiency. As the transformation efficiency is high, a purifying performance of the exhaust gas component is good. In FIGS. 2 and 3, a solid line shows characteristics of the main catalytic converter of a large capacity when it is fresh and a broken line indicates characteristics when the main catalytic converter deteriorated. A curve shown by an alternate long and short dash line shows characteristics of the start catalytic converter of a small capacity.

From the transformation efficiency characteristics of the catalytic converter to the exhaust gas flow rate of FIG. 2, it will be understood that in a relatively small exhaust gas flow rate region A at the time of a low load, the activations of the upper catalytic converter and lower catalytic converter progress at an almost same speed and the conversion efficiency is saturated. In a high load region B exceeding the exhaust gas flow rate region A, the exhaust gas exceeding a transforming ability corresponding to the capacity of the upper catalytic converter flows. Therefore, since an exhaust gas of a large quantity such that it cannot be fully converted by the start catalytic converter is generated in the high load region, the transformation efficiency of the upper catalytic converter deteriorates.

Therefore, when the engine is being operated in the high load region B of a large exhaust gas flow rate, if the correlation function is obtained on the basis of the outputs of the oxygen sensors 6 and 7 in the upstream and downstream, an influence by the start catalytic converter 8 is reduced and the deterioration of only the lower catalytic converter 9 can be substantially diagnosed.

As will be obviously understood from the transformation efficiency of the catalyst to the exhaust gas temperature of FIG. 3, for example, in case of an operating region C at a low exhaust temperature like a state just after the start of the engine, a temperature of the upper catalytic converter 8 of a small capacity which is arranged at a position near the exhaust manifold 5' reaches a catalyst activation temperature earlier than the lower catalytic converter 9. In this temperature region C, the lower catalytic converter 9 is not activated yet. Therefore, when the operating region of the engine lies in the region C of the low exhaust gas temperature or just after the start of the engine, if the correlation function is obtained on the basis of the outputs of the oxygen sensors 6 and 7 in the upstream and downstream, the influence by the lower catalytic converter 9 is reduced and the deterioration of only the upper catalytic converter 8 can be substantially diagnosed.

With respect to the diagnosis of the whole catalytic converters in the upstream and the downstream, the deteriorations are simultaneously judged in an operating region where the exhaust gas transformation efficiencies of both of the upper and lower catalytic converters can be represented. Although its diagnosis region differs depending on the system. For example, the diagnosis region is set to an operating (load) region in which the exhaust gas flow rate is smaller than the upper limit of the ability of the upper catalytic converter 8 and an exhaust gas flow rate (or catalyst temperature) such that an activating state in which a difference of the deterioration state of the lower catalyst 9 can be sufficiently judged is obtained can be derived. Such an operating region is, for example, a region of A in FIG. 2.

The upper and lower catalytic converters and the operating region to diagnose the whole converters described above differ depending on a type of the emission control system. Therefore, they are preliminarily experimentally determined every individual emission control system. The operating region corresponding to the catalyst diagnosis region is, for example, judged on the basis of at least one or more of the following operating state parameters (detection values by the sensors and the like, internal arithmetic operation values in the control apparatus) which are used in the engine control: namely, an engine rotational speed; an engine load; an intake air quantity of the engine; an opening degree of a throttle valve; an idle judgment signal; a vehicle speed; a temperature of a cooling water of the engine; a temperature of the engine oil; an engine control amount at the time of the idling operation; a fuel injection amount; a catalyst temperature; catalyst activation state information; temperatures of the A/F ratio sensors; activation state information of the A/F ratio sensors; and the like.

Figure 4:
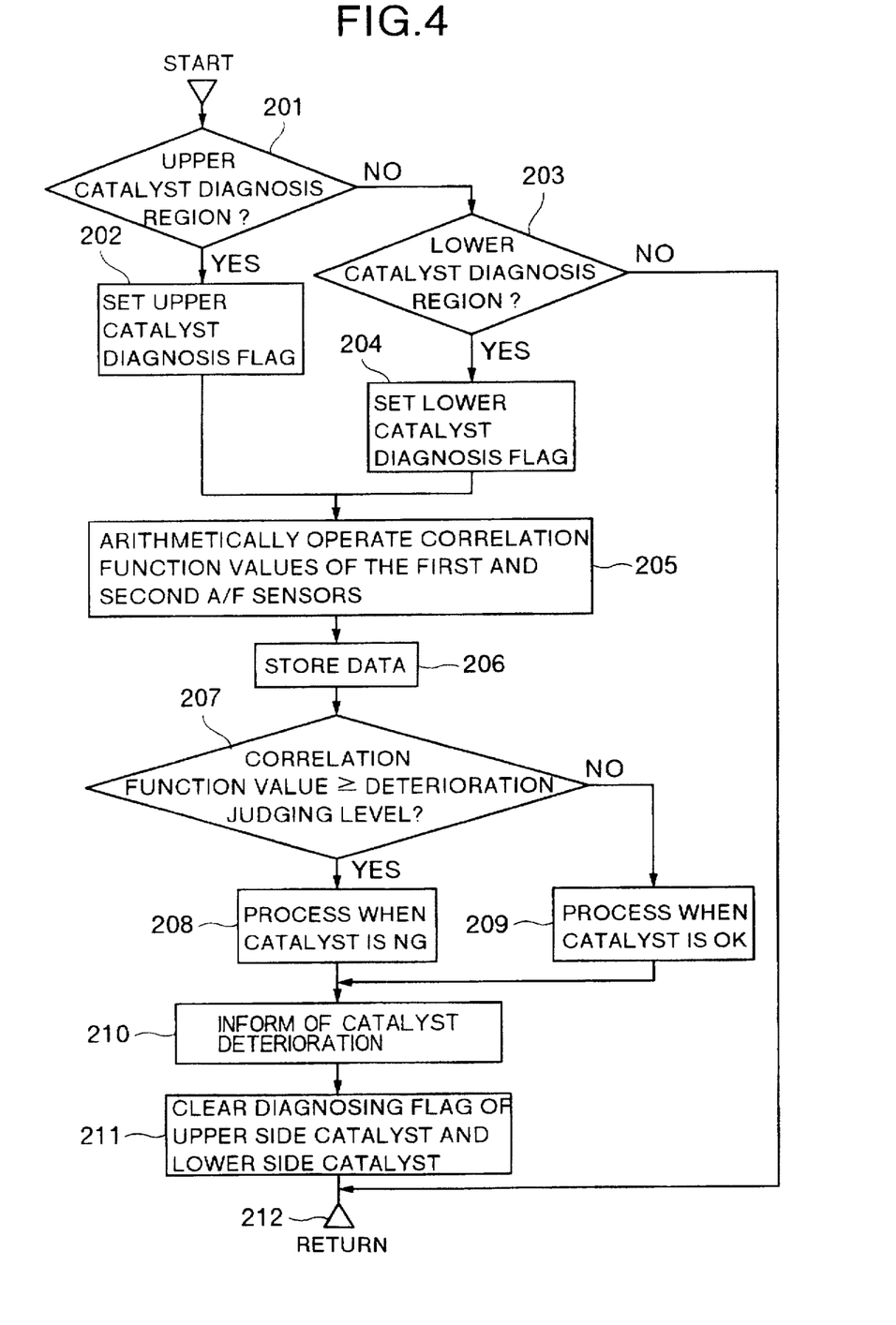
FIG. 4 is a diagnosing flowchart of the diagnosing system of the catalytic converter in FIG. 1.

FIG. 4 is a control flowchart for the diagnosing system in FIG. 1. Explanation will now be made hereinbelow with reference to FIG. 4.

When the engine is started, the control apparatus 3 operates and the control is started and the program is started. First in step 201, a check is made to see if the engine lies in the operating region for diagnosing the upper catalytic converter 8. If YES, step 202 follows. In step 202, a diagnosis start flag of the start catalytic converter 8 is set. In step 205, a correlation function is calculated on the basis of the output signals of the first and second A/F ratio sensors 6 and 7.

When it is judged in step 201 that the operating region is not the diagnosis region of the upper catalytic converter 8, a check is made in step 203 to see if it is the operating region for diagnosing the lower catalytic converter 9. When the operating region is a diagnosis region of the lower catalytic converter 9, the diagnosis start flag of the lower catalytic converter 9 is set in step 204. In step 205, a correlation function is calculated on the basis of the output signals of the first and second A/F ratio sensors 6 and 7.

When the operating region is not the diagnosis region of the lower catalytic converter 7, the processing routine is returned to START from RETURN in step 212 and the program is restarted. The control can be also realized by replacing step 203 to the whole diagnosis of the two catalytic converters.

In step 206, further, each of the above arithmetic operation results is stored into the memory (not shown) and the processing routine advances to step 207.

In step 207, the correlation function value of the upper catalytic converter 8 or lower catalytic converter 9 is compared with a corresponding predetermined deterioration judging level. When the diagnosis result of either one of the above catalytic converters exceeds the judging level, it is judged in step 208 that the catalytic converter exceeding the judging level deteriorated. A process in the case where the catalyst is ineffective is executed. When the correlation function value doesn't exceed the judging level, a process when the catalyst is effective is executed in step 209. For example, an operation to light off the alarm lamp 18 or the like is executed. In step 210, a process to inform the operator of the deterioration of the catalyst is executed.

In step 211, a process to clear the diagnosis flag at the end of the diagnosis is executed. The processing routine is returned to START from RETURN in step 212. The program is restarted.

Figure 5:
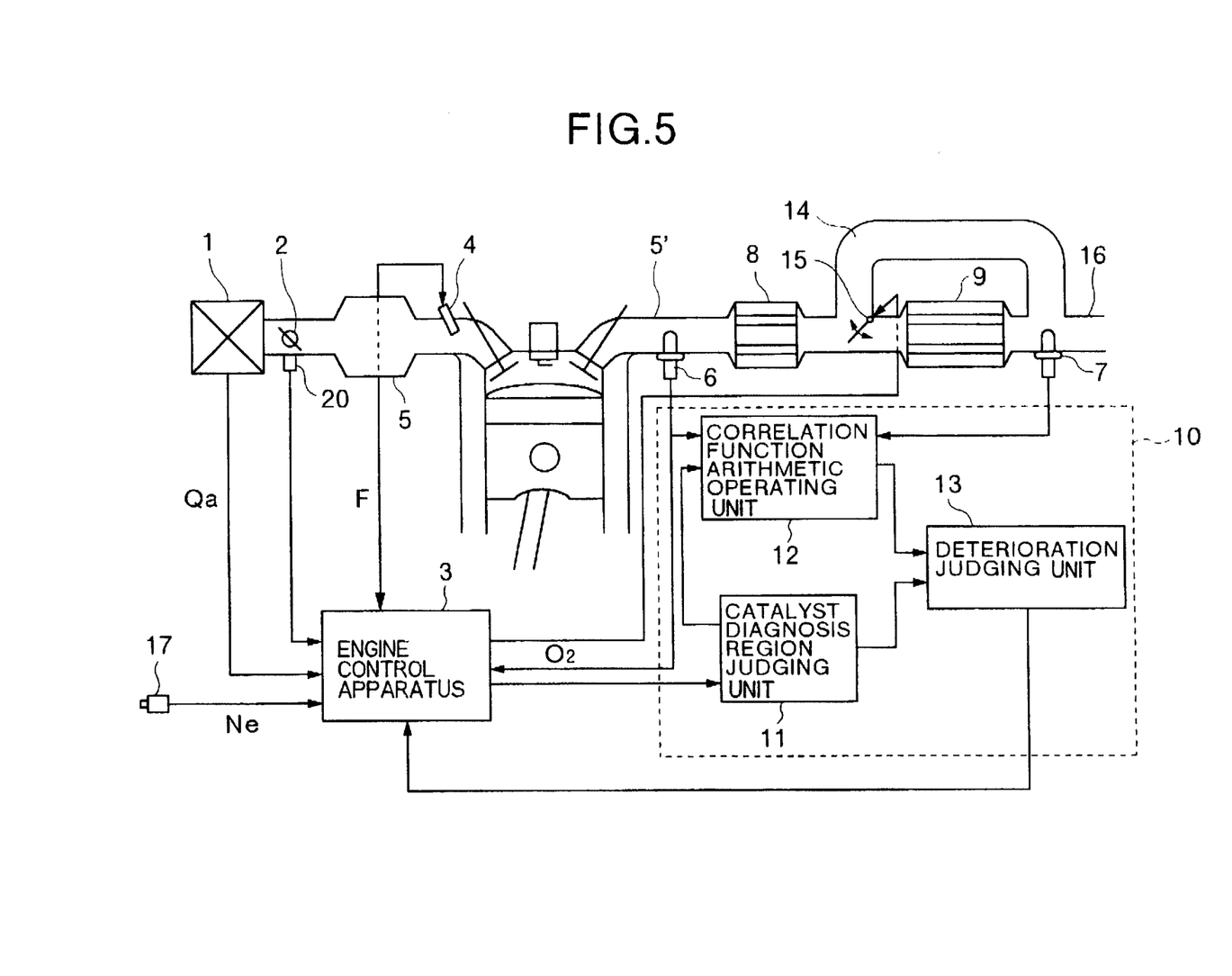
FIG. 5 is a block diagram of a diagnosing system of a catalytic converter in an exhaust gas control system according to another embodiment of the invention.

FIG. 5 is a diagram showing a system according to another embodiment of the invention. FIG. 5 differs from the system shown in FIG. 1 with respect to the following large point. Namely, a bypass passage 14 and a bypass valve 15 are provided, thereby enabling the exhaust gas which passed through the upper catalytic converter 8 to be bypassed to the exhaust passage 16 on the downstream side of the lower catalytic converter 9. In FIG. 5, the same component elements and means as those in the first embodiment in FIG. 1 are designated by the same reference numerals and their descriptions are omitted here.

Figure 6A:
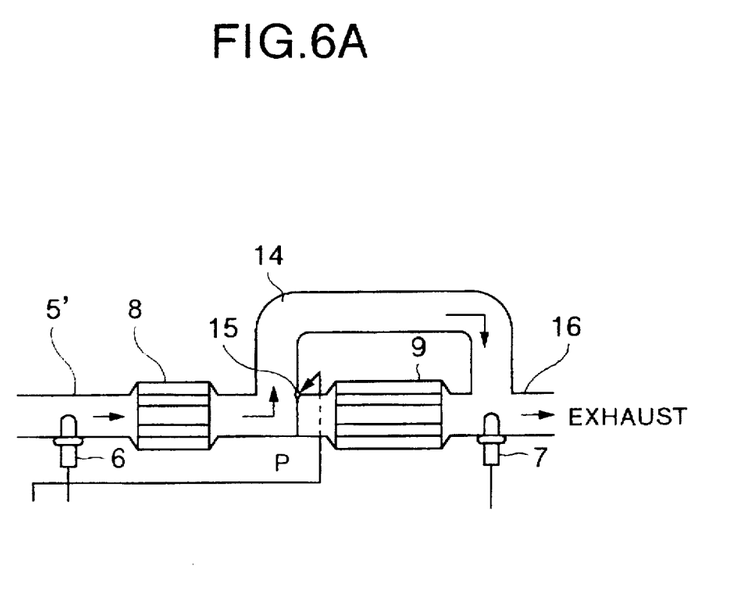
FIGS. 6A and 6B are enlarged diagrams of a main section of an exhaust system showing a case where a bypass passage is opened and a case where it is closed.

In the diagnosing system shown in FIG. 5, when the start catalytic converter 8 is diagnosed, as shown in a partial enlargement diagram of FIG. 6A, the system is set into a state in which the bypass valve 15 which is closed in the normal operating mode is opened by a switching control signal P. The exhaust gas which was purified by the upper catalytic converter 8 passes through the bypass passage 14 and flows to the exhaust passage 16 on the downstream side of the lower catalytic converter 9. Thus, the diagnosis of the upper catalytic converter 8 becomes the same diagnosis of the sole catalytic converter. Since the exhaust gas which is detected by the A/F ratio sensor 7 on the downstream side is not influenced by the lower catalytic converter 9, the individual diagnosis of the upper catalytic converter 8 can be performed even in the operating region of a wide range without limiting to the timing just after the start at a low temperature (region C in FIG. 3).

In a manner similar to the embodiment of FIG. 1, even in the diagnosing system, the diagnosis of the upper catalytic converter 8 and lower catalytic converter 9 or the diagnosis of the whole catalytic converters 8 and 9 is executed on the basis of the correlation relation between the output signals of the first and second A/F ratio sensors 6 and 7.

Figure 7:
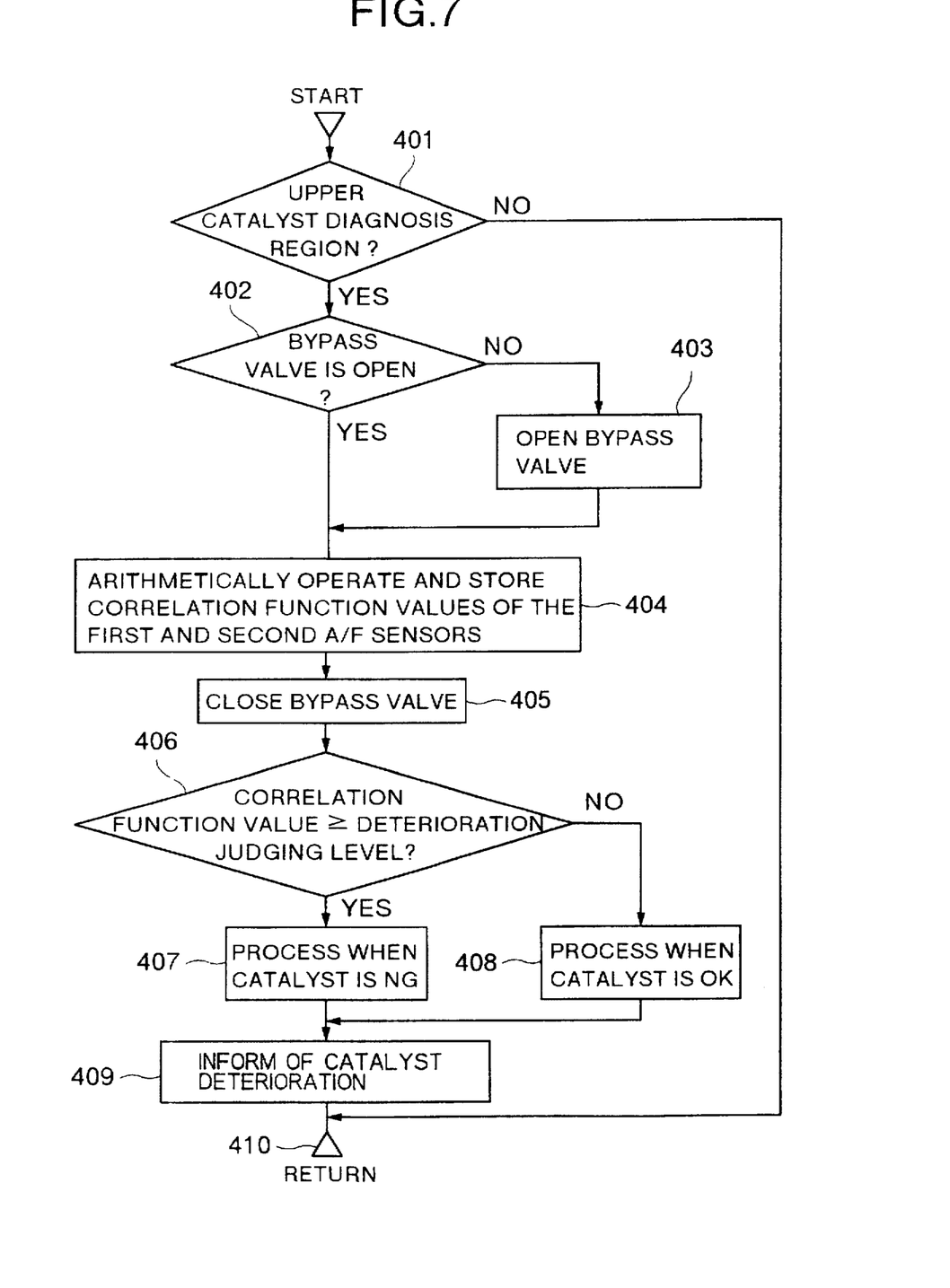
FIG. 7 is a flowchart in case of diagnosing a start catalytic converter in the diagnosing system of FIG. 5.

FIG. 6A shows a state in which the bypass valve 15 in case of diagnosing the upper catalytic converter 8 is open in the diagnosing system of the embodiment. FIG. 7 is a control flowchart in such a state and explanation will now be made hereinbelow with reference to FIG. 7.

When the engine is started, the control apparatus 3 operates and the control is started. The program is started. First in step 401, the catalyst diagnosis region judging unit 11 judges whether the present operating region of the engine is a diagnosis region of the upper catalytic converter 8 or not. When the operating region is the diagnosis region of the upper catalytic converter 8, step 402 follows.

When it is judged in step 401 that the present operating region is not the diagnosis region of the upper catalytic converter 8, the processing routine is returned to START from RETURN in step 410. The program is restarted. In step 402, a check is made to see if the bypass valve 15 is open. When the bypass valve 15 is open, step 404 follows. When the bypass valve 15 is closed, step 403 follows and the operation to open the bypass valve 15 is instructed. The processing routine advances to next step 404.

In step 404, the correlation function between the output signals of the first and second A/F ratio sensors arranged before and after the start catalytic converter 8 is calculated by the correlation function arithmetic operating unit 12. A process to store the arithmetic operation result is performed. After completion of the arithmetic operation of the correlation function and the process to store the arithmetic operation result, the bypass valve 15 is closed in step 405. In step 406, the calculated correlation function value is compared with a predetermined deterioration judging level by the deterioration judging unit 13. When the correlation function value exceeds the deterioration judging level, it is judged in step 407 that the catalyst deteriorated, so that a process in case of the ineffective catalyst is executed. On the other hand, when the correlation function value doesn't exceed the judging level, the process in case of the effective catalyst is executed in step 408. In step 409, the deterioration of the catalyst is displayed. For example, a fact that the catalyst deteriorated is informed to the driver by a light-on of the alarm lamp 18 or the like.

Figure 6B:
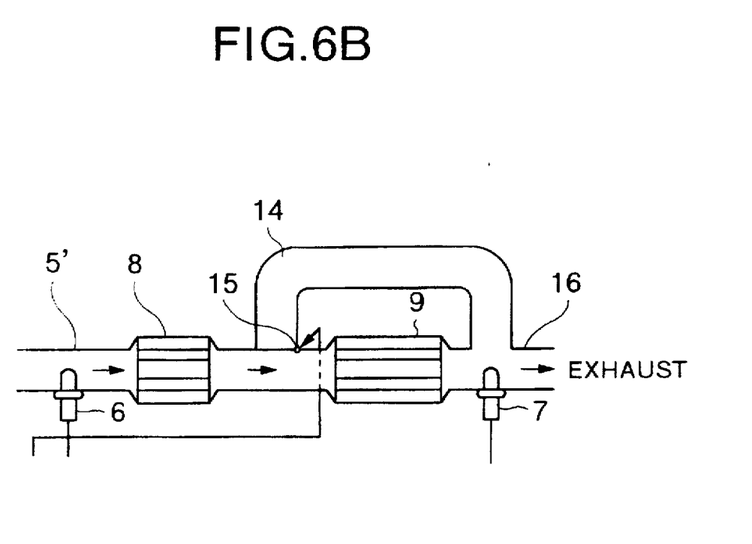

As a method of diagnosing the lower catalytic converter 9 or the whole catalytic converters 8 and 9, a method similar to the first embodiment of FIG. 1 is used. As shown in FIG. 6B, the diagnosis is executed with the bypass valve 15 closed. As diagnosing conditions of the lower catalytic converter 9, the diagnosis has to be performed under the operating condition (for example, A in FIG. 2) such that the operating region is in a high load region where the cleaning ability due to the catalytic function cannot be made the most of even if the start catalytic converter 8 doesn't deteriorate, the lower catalytic converter 9 was sufficiently activated, or the exhausting state doesn't deteriorate. The whole diagnosing conditions are similar to those in case of FIG. 1.

Figure 8:
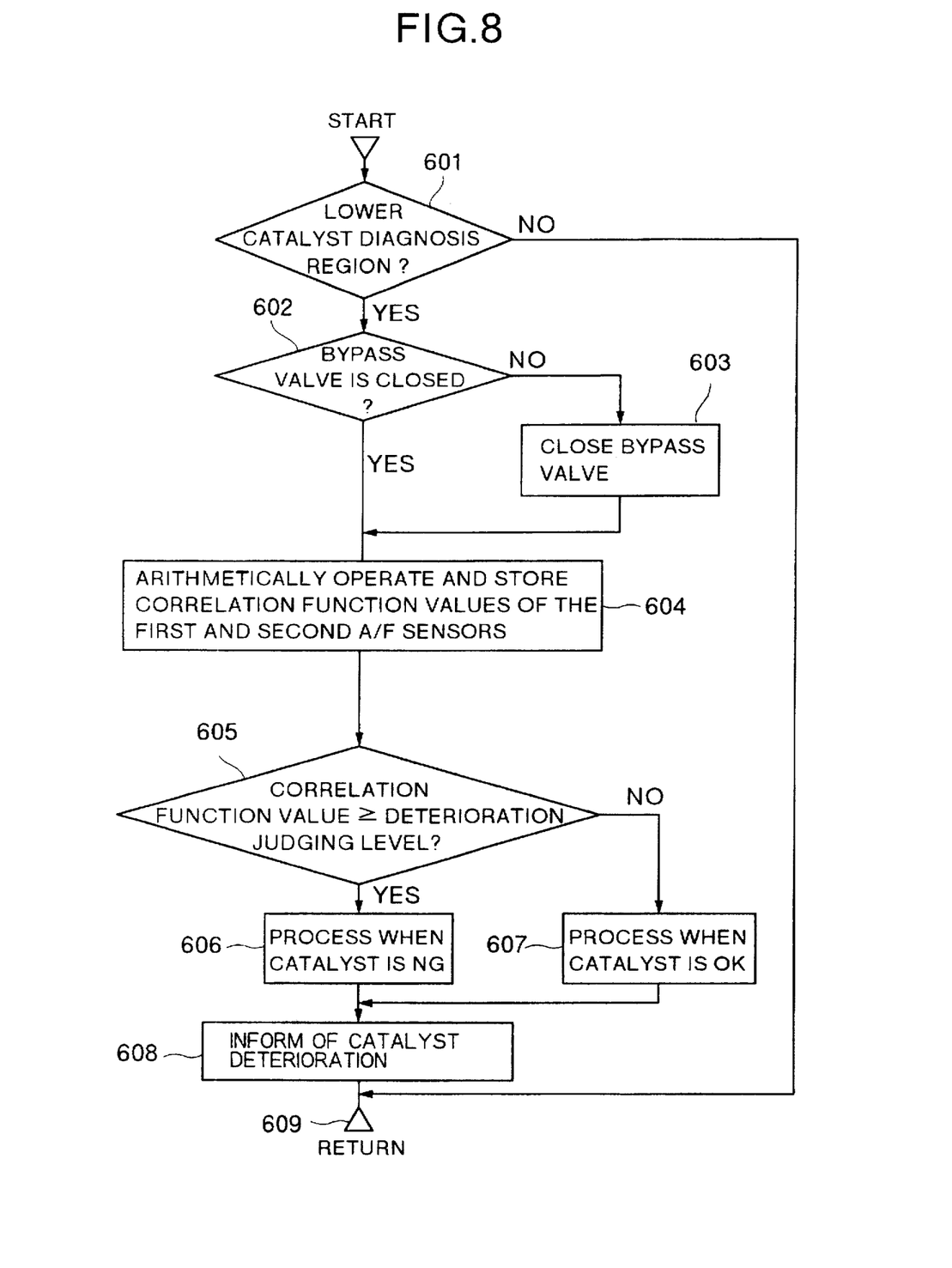
FIG. 8 is a flowchart in case of diagnosing a main catalytic converter in the diagnosing system of FIG. 5.

FIG. 8 shows a control flowchart in the diagnosis of the main catalytic converter 9 in the state of FIG. 6B. Explanation will now be made hereinbelow. The whole diagnosis can be also realized by a control flow similar to that mentioned above.

First in step 601, the catalyst diagnosis region judging unit 11 judges whether the present operating region of the engine lies in the diagnosis region of the lower catalytic converter 9 or not. When it is judged in step 601 that the present operating region is not the diagnosis operating region of the lower catalytic converter 9, the processing routine is returned to START from RETURN in step 609 and the program is restarted. When the present operating state lies within the diagnosis region of the main catalytic converter 9, step 602 follows. In step 602, a check is made to see if the bypass valve 15 has been closed. When the bypass valve 15 is open, the bypass valve 15 is closed as shown in FIG. 6B in step 603.

When the bypass valve 15 is closed, step 604 follows. In step 604, the correlation function between the output signals of the first and second A/F ratio sensors 6 and 7 is calculated by the correlation function arithmetic operating unit 12 and the calculation result is stored. After completion of the arithmetic operation of the correlation function value, the calculated correlation function value is compared with the predetermined deterioration judging level by the deterioration judging unit 13 in step 605. When the correlation function value exceeds the deterioration judging level, it is judged in step 606 that the catalyst deteriorated. The process in case of the ineffective catalyst is executed. On the other hand, when the correlation function value doesn't exceed the judging level, step 607 follows and the process in case of the effective catalyst is executed. When it is judged in step 608 that the main catalytic converter 9 deteriorated, the deterioration of the catalyst is displayed. For example, the deterioration of the catalyst is informed to the driver by a light-on of the alarm lamp 18 or the like.

According to the embodiment, since each catalytic converter (namely, upper or lower catalytic converter 8 or 9) or the whole catalytic converters 8 and 9 can be handled in the same manner as that in case of the sole catalytic converter, so that the individual diagnosis can be easily performed.

According to further another embodiment of the catalytic converter diagnosing system of the invention, in case of obtaining the correlation function, in place of the output of the oxygen sensor 6 on the upstream side, the output a of the A/R ratio feedback calculating unit 31, namely, an A/F ratio correction coefficient can be used. In this case, the correlation function between the signal of a and the output signal of the oxygen sensor 7 on the downstream side is executed by using a calculating method similar to that in case of the embodiment of FIG. 1.

Since an information indicating the deviation from the stoichiometric value of the air/fuel ratio of the mixture gas is included in the signal of the A/F ratio correction coefficient a, a deterioration judging accuracy is improved more than that in case of using the output of the oxygen sensor 6 on the upstream side.

As will be understood from the above description, according to the diagnosing system of the catalytic converters of the exhaust emission control system according to the invention, in spite of the fact that it is the exhaust emission control system having a plurality of catalytic converters, the correlation relation between the output signals of the A/F ratio sensors before and after the catalytic converters is diagnosed by examining each catalytic converter in different regions, thereby enabling the individual diagnosis of each catalytic converter to be executed.

What is claimed is:

1. A diagnosing system of a catalytic converter for controlling an exhaust gas in an internal combustion engine having means for detecting an operating state of the internal combustion engine and air/fuel ratio control means for adjusting a fuel injection amount so as to keep an air/fuel ratio of a mixture which is inhaled into said internal combustion engine to a target value, comprising:

a catalytic converter array including a plurality of catalytic converters arranged serially in an exhaust gas passage of said internal combustion engine;

a first exhaust gas component sensor arranged on the upstream side of said catalytic converter array;

a second exhaust gas component sensor arranged on the downstream side of said catalytic converter array; and diagnosing means for diagnosing a performance of a part of said plurality of catalytic converters or a performance of said catalytic converter array on the basis of output signals of said first and second exhaust gas component sensors in accordance with the operating state which is detected by said means for detecting said operating state.

2. A system according to claim 1, wherein said diagnosing means has diagnosis region judging means for instructing that said internal combustion engine is in a predetermined operating region on the basis of said detected operating state, and further, said diagnosing means diagnoses the upper catalytic converter arranged on the upstream side of said catalytic converter array and the lower catalytic converter arranged on the downstream side in designated different operating regions, respectively.

3. A system according to claim 2, wherein the operating region to diagnose said lower catalytic converter arranged on the downstream side is a high load region of a load higher than that of an operating region to diagnose said upper catalytic converter arranged on the upstream side.

4. A system according to claim 3, wherein said upper catalytic converter arranged on the upstream side has a catalyst capacity smaller than that of said lower catalytic converter arranged on the downstream side.

5. A system according to claim 2, wherein the operating region to diagnose said upper catalytic converter arranged on the upstream side is a region before said main catalytic converter arranged on the downstream side is activated.

6. A system according to claim 2, wherein in said operating region of diagnosing said catalytic converter array, said internal combustion engine is operated in a predetermined load range.

7. A system according to claim 2, wherein the operating region to diagnose said whole catalytic converter array is a region in which said internal combustion engine is being operated in a predetermined load range and is a temperature of said catalyst is in a predetermined region.

8. A system according to claim 2, wherein said catalytic converter array includes two catalytic converters arranged on the upstream side and the downstream side of an exhaust gas passage.

9. A system according to claim 2, wherein said diagnosing means has:

means for arithmetically operating a correlation function of output signals of said first and second exhaust gas component sensors; and means for comparing said correlation function which was arithmetically operated with a reference value, thereby judging that said catalytic converter or said catalytic converter array deteriorated in the case where said correlation function is equal to or larger than said reference value.

10. A system according to claim 9, wherein said first and second exhaust gas component sensors are oxygen sensors for generating signals to detect a case where a concentration of oxygen in the exhaust gas is larger than a predetermined value and a case where said oxygen concentration is smaller than said predetermined value.

11. A system according to claim 10, wherein said air/fuel ratio control means has means for generating a fuel injection amount correction signal to correct a deviation from said target air/fuel ratio on the basis of an output signal from said first exhaust gas component sensor, and said correlation function arithmetic operating means arithmetically operates a correlation function between said fuel injection amount correction signal and an output signal of said second exhaust gas component sensor.

12. A system according to claim 9, further having means for alarming a deterioration in response to a fact that said catalytic converter deteriorated.

13. A diagnosing system of a catalytic converter for controlling an exhaust gas in an internal combustion engine having means for detecting an operating state of the internal combustion engine and air/fuel ratio control means for adjusting a fuel injection amount so as to keep an air/fuel ratio of a mixture that is inhaled into said internal combustion engine to a target value, comprising:

a catalytic converter array including a upper catalytic converter arranged on the upstream side of an exhaust gas passage of said internal combustion engine and a lower catalytic converter arranged on the downstream side;

a first exhaust gas component sensor arranged on the upstream side of said catalytic converter array;

a second exhaust gas component sensor arranged on the downstream side of said catalytic converter array;

a bypass passage for bypassing said lower catalytic converter;

valve means for controlling so as to allow the exhaust gas which passed through said upper catalytic converter to pass through either one of said main catalytic converter and said bypass passage in accordance with a switching signal; and diagnosing means for diagnosing performances of said upper catalytic converter and said lower catalytic converter or a performance of said catalytic converter array on the basis of output signals of said first and second exhaust gas component sensors.

14. A system according to claim 13, further having control means for supplying to said valve means said switching signal for allowing the exhaust gas which passed through said upper catalytic converter to pass through said bypass passage in case of diagnosing said upper catalytic converter.

15. A system according to claim 14, wherein
said diagnosing means has diagnosis region judging means for instructing that said internal combustion engine is in a predetermined operating region on the basis of the detected operating state, and
further, said diagnosing means diagnoses said upper catalytic converter and said lower catalytic converter in designated different operating regions.

16. A system according to claim 14, wherein the operating region to diagnose said lower catalytic converter is a high load region of a load higher than that of the operating region to diagnose said upper catalytic converter.

17. A system according to claim 16, wherein said upper catalytic converter has a catalyst capacity smaller than that of said lower catalytic converter.

18. A system according to claim 14, wherein the operating region to diagnose said catalytic converter array is a region when said internal combustion engine is being operated in a predetermined load range.

19. A system according to claim 14, wherein the operating region to diagnose said catalytic converter array is a region in which said internal combustion engine is being operated in a predetermined load range and is a predetermined catalyst temperature region.

20. A system according to claim 14, wherein said diagnosing means has:
means for arithmetically operating a correlation function between output signals of said first and second exhaust gas component sensors; and
means for comparing said correlation function which was arithmetically operated with a reference value, thereby judging that said catalytic converter or said catalytic converter array deteriorated in the case where said correlation function is equal to or larger than said reference value.

21. A system according to claim 20, wherein said first and second exhaust gas component sensors are oxygen sensors for generating signals to detect a case where a concentration of oxygen in the exhaust gas is larger than a predetermined value and a case where said oxygen concentration is smaller than said predetermined value.

22. A system according to claim 21, wherein
said air/fuel ratio control means has means for generating a fuel injection amount correction signal to correct a deviation from said target air/fuel ratio on the basis of an output signal from said first exhaust gas component sensor, and
said correlation function arithmetic operating means arithmetically operates a correlation function between said fuel injection amount correction signal and an output signal of said second exhaust gas component sensor.

23. A system according to claim 20, further having means for alarming a deterioration in response to a fact that said catalytic converter deteriorated.

24. A diagnosing method of a catalytic converter in an internal combustion engine having means for detecting an operating state of the internal combustion engine, air/fuel ratio control means for adjusting a fuel injection amount so as to keep an air/fuel ratio of a mixture that is inhaled into said internal combustion engine to a target value, and a plurality of catalytic converters arranged serially in an exhaust gas passage of said internal combustion engine, comprising the steps of:
confirming that said internal combustion engine is in a predetermined operating region to execute a catalyst diagnosis on the basis of said detected operating state; and
diagnosing performances of said catalytic converter or a performance of said catalytic converters on the basis of an output signal of a first exhaust gas component sensor arranged on the upstream side of said catalytic converters and an output signal of a second exhaust gas component sensor arranged on the downstream side in each of a plurality of different catalyst diagnosis regions corresponding to the different operating regions, respectively.

25. A method according to claim 24, wherein the operating region to diagnose the lower catalytic converter arranged on the downstream side of said exhaust gas passage is a high load region of a load higher than that of the operating region to diagnose the upper catalytic converter arranged on said upstream side.

26. A method according to claim 24, wherein the operating region to diagnose said upper catalytic converter arranged on said upstream side is a region before said lower catalytic converter arranged on the downstream side is activated.

27. A method according to claim 24, wherein the operating region to diagnose said catalytic converters is a region when said internal combustion engine is being operated in a predetermined load range.

28. A method according to claim 24, wherein the operating region to diagnose said whole catalytic converters is a region in which said internal combustion engine is being operated in a predetermined load range and is a predetermined catalyst temperature region.

29. A method according to claim 24, further having the steps of:
arithmetically operating a correlation function between output signals of said first and second exhaust gas component sensors;
comparing said correlation function which was arithmetically operated with a reference value; and
judging that said catalytic converter or said catalytic converters is deteriorated in the case where said correlation function is equal to or larger than said reference value.

30. A method according to claim 24, wherein said air/fuel ratio control means generates a fuel injection amount correction signal to correct a deviation from said target air/fuel ratio on the basis of the output signal from said first exhaust gas component sensor and a correlation function between said fuel injection amount correction signal and the output signal of said second exhaust gas component sensor is arithmetically operated.

31. A diagnosing method of a catalytic converter in an internal combustion engine having means for detecting an operating state of the internal combustion engine, air/fuel ratio control means for adjusting a fuel injection amount so as to keep an air/fuel ratio of a mixture that is inhaled into said internal combustion engine, and a upper catalytic converter and a lower catalytic converter arranged serially on the upstream side and the downstream side in an exhaust gas passage of said internal combustion engine, comprising the steps of:
allowing the exhaust gas which passed through said upper catalytic converter to pass through said lower catalytic converter;

allowing the exhaust gas which passed through said upper catalytic converter to be bypassed said lower catalytic converter; and diagnosing performances of said upper catalytic converter and said lower catalytic converter or a performance of said catalytic converters on the basis of output signals of said first and second exhaust gas component sensors in each of said steps, respectively.

32. A method according to claim 31, wherein in case of diagnosing said upper catalytic converter, the exhaust gas which passed through said upper catalytic converter is bypassed said lower catalytic converter.

33. A method according to claim 31, further having the step of judging that said internal combustion engine is in a predetermined region on the basis of the detected operating state, and wherein said predetermined operating region to diagnose said upper catalytic converter and said lower catalytic converter is set to different operating regions.

34. A method according to claim 33, wherein the operating region to diagnose said lower catalytic converter is a high load region of a load higher than the operating region to diagnose said upper catalytic converter.

35. A method according to claim 33, wherein the operating region to diagnose said whole upper catalytic converter and lower catalytic converter is a region when said internal combustion engine is being operated in a predetermined load range.

36. A method according to claim 33, wherein the operating region to diagnose said whole upper catalytic converter and lower catalytic converter is a region in which said internal combustion engine is being operated in a predetermined load range and is a predetermined catalyst temperature region.

37. A method according to claim 31, further having the steps of:

arithmetically operating a correlation function between the output signals of said first and second exhaust gas component sensors;

comparing said correlation function which was arithmetically operated with a reference value; and judging that said catalytic converter deteriorated in the case where said correlation function is equal to or larger than said reference value.

38. A method according to claim 31, wherein said air/fuel ratio control means generates a fuel injection amount correction signal to correct a deviation from said target air/fuel ratio on the basis of the output signal from said first exhaust gas sensor, and a correlation function between said fuel injection amount correction signal and an output signal of said second exhaust gas component sensor is arithmetically operated.

39. A diagnosing system of a catalytic converter for controlling an exhaust gas in an internal combustion engine having means for detecting an operating state of the internal combustion engine and air/fuel ratio control means for adjusting a fuel injection amount so as to keep an air/fuel ratio of a mixture which is inhaled into said internal combustion engine to a target value, comprising:

a catalytic converter array including a plurality of catalytic converts arranged serially in an exhaust gas passage of said internal combustion engine;

a sensor array consisting of a first exhaust gas component sensor arranged on the upstream side of said catalytic converter array and a second exhaust gas component sensor arranged on the downstream side of said catalytic converter array; and diagnosing means for diagnosing a performance of a part of said plurality of catalytic converters or a performance of said catalytic converter array on the basis of output signals of said first and second exhaust gas component sensors in accordance with the operating state which is detected by said means for detecting said operating state.

* * * * *